UNITED STATES PATENT OFFICE.

JOHN T. DAVIS, OF SAN FRANCISCO, CALIFORNIA.

ARTIFICIAL FUEL.

SPECIFICATION forming part of Letters Patent No. 705,216, dated July 22, 1902.

Application filed August 7, 1900. Serial No. 26,177. (No model.)

*To all whom it may concern:*

Be it known that I, JOHN T. DAVIS, a citizen of the United States, residing at San Francisco, in the county of San Francisco and State of California, have invented certain new and useful Improvements in Artificial Fuel, of which the following is a specification.

My invention relates to artificial fuels; and my object is, first, to provide a binding composition for agglomerating fine coal, lignite, dust, or other material of a carboniferous nature, and, secondly, to produce a composition by such agglomeration which when molded into blocks, briquets, or other forms will be hard, homogeneous, and tenacious, capable of standing up in the fire until consumed like good natural coal, and also capable of retaining and preserving form, shape, and consistency in any climate or under changes of temperature.

For my binding composition I use natural or artificial pitch, treated with free carbonic-acid gas, preferably that derived from carbonate of lime in any of its natural forms. Exact proportions cannot be stated, since different kinds of pitch and different kinds of carboniferous material cause such proportions to vary. Stated generally, however, the composition contains from sixty pounds to one hundred and eighty pounds of pitch and from thirteen to sixty pounds of carbonic-acid gas. This latter ingredient would be the product of from thirty to one hundred and forty pounds of pulverized carbonate of lime. These proportions are to one thousand pounds of carboniferous material. The solid ingredients named are preferably heated together in a suitable vessel to a temperature of from 250° to 350° Fahrenheit with stirring, so as to thoroughly mix and incorporate them, when the carbonate of lime is acted upon and begins to give off carbonic-acid gas. The heating and stirring are continued until both by mechanical union and chemical action the pitch becomes of stiffer and tougher consistency, suited to the particular purpose for which I intend it. At that time I add to the mixture about one thousand (1,000) pounds of the carboniferous fuel material, which may be any suitable substance, such as coal, slack, lignite, or other carboniferous material in a finely-divided state. This latter ingredient has preferably been heated in a separate vessel to about the temperature of the first compound, although such temperature is not essential, the purpose of a preliminary heating of the coal being mainly to avoid chilling the compound and retarding the process and all chemical change that is going on in the mass. The heating, mixing, and stirring of the mass is continued after the addition of the fuel ingredient and chemical action a sufficient time for a thorough incorporation to take place. The resulting composition is then pressed or molded into convenient shapes for use.

The chemical action taking place when the carbonate of lime and pitch are heated and mixed together and which is due to the action of carbonic acid causes the toughening of the pitch, so that it has a quality entirely different from that which originally characterized it and which makes it a suitable substance for agglomerating fine material into a hard substantial fuel, which has the special property of keeping its shape in the fire as it consumes. The carbonate of lime must be carefully distinguished, however, from ordinary lime produced by calcination, whether water-slaked or not.

It will be observed that the preparation of the binding material by heating pitch and lime carbonate together renders it unnecessary to reduce the pitch to any exact consistency or hardness as a preliminary to the mixing in order to produce an ultimate fuel of given density. This can be done in the mixing process by regulating the heat and the time of mixing and heating, a softer pitch requiring more time in mixing and heating to bring it to the proper degree of toughness.

Good results in the way of an artificial fuel can be obtained by varying the process of production. For instance, all the ingredients mentioned can be mixed together in a cold state and then heated gradually to the required temperature. This method can be adopted where circumstances, such as lack of space, render it inconvenient to use the separate treatments first described; but the process necessarily requires more time, and I prefer the first method. As another variation the pulverized carbonate can be introduced into and mingled with the coal before heating the latter or while it is being heated and heated pitch added after the coal has reached the proper temperature. The mass is then treated by heat and stirring until the chemical and mechanical unions before referred to are complete.

The temperatures mentioned are referred to as the lowest at which any of the carbonic-acid gas will be eliminated to act upon the pitch present. The temperatures above 250° to 300° Fahrenheit are continually eliminating the carbonic-acid gas, even up to the temperature of 1000° to 1200° Fahrenheit. There is a certain amount of carbonic-acid gas eliminated at the temperature of 300°, which is sufficient to commence the hardening process, so that a hard tough fuel is prepared for combustion. The continution of the higher temperature in the later process of combustion eliminates all of the carbonic-acid gas in the lime, and thus I continue the process of hardening and coking the pitch with the coal, to prevent disintegration while being consumed. The temperatures of 250° to 300° are intended as a minimum therefor and not as a fixed temperature.

Having thus fully described my invention, what I claim as new, and desire to secure by Letters Patent, is—

1. A binder for artificial fuel, composed of pitch, hardened and toughened by free carbonic-acid gas, 2. An artificial fuel composed of pitch hardened and toughened by free carbonic-acid gas, and carboniferous material in a divided condition, all mixed and incorporated in substantially the proportions specified.

3. The process of manufacturing artificial fuel, consisting of mixing pitch with a carbonate, applying heat to the mixture to obtain free carbonic-acid gas and adding a carboniferous material to the resulting mass, as and for the purpose specified.

4. The process of making artificial fuel, which consists in mixing approximately one hundred parts of pitch with approximately thirty parts of a carbonate, heating to obtain free carbonic-acid gas, and then adding to the resulting mass approximately one thousand parts of carboniferous material, as and for the purpose described.

5. The process of making artificial fuel, consisting of treating a mixture of from sixty to one hundred and eighty parts of pitch with thirteen to sixty parts of carbonic-acid gas, and adding one thousand parts, by weight, of carboniferous material, as and for the purpose specified.

6. An artificial fuel derived from substantially the following ingredients: sixty to one hundred and eighty parts pitch, thirteen to sixty parts carbonic acid, and one thousand parts carboniferous material.

In testimony whereof I have affixed my signature, in presence of two witnesses, this 31st day of July, 1900.

JOHN T. DAVIS.

Witnesses:
L. W. SEELY,
F. M. BURT.